(12) United States Patent
Subramanian

(10) Patent No.: US 8,761,005 B2
(45) Date of Patent: Jun. 24, 2014

(54) MULTI-CHASSIS LINK AGGREGATION ON NETWORK DEVICES

(75) Inventor: Krishnamurthy Subramanian, Mountain View, CA (US)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 13/456,459

(22) Filed: Apr. 26, 2012

(65) Prior Publication Data

US 2012/0275297 A1 Nov. 1, 2012

Related U.S. Application Data

(60) Provisional application No. 61/478,967, filed on Apr. 26, 2011.

(51) Int. Cl.
*G01R 31/08* (2006.01)
*H04L 12/28* (2006.01)

(52) U.S. Cl.
USPC .................................. 370/225; 370/431

(58) Field of Classification Search
USPC .......... 370/216, 225, 228, 252, 431–434, 463
See application file for complete search history.

(56) References Cited

U.S. PATENT DOCUMENTS

| | | | |
|---|---|---|---|
| 5,913,207 A | 6/1999 | Chaudhuri et al. | |
| 7,730,216 B1 | 6/2010 | Issa et al. | |
| 7,912,091 B1 * | 3/2011 | Krishnan et al. | 370/490 |
| 8,085,791 B1 * | 12/2011 | Aggarwal et al. | 370/400 |
| 2003/0061533 A1 * | 3/2003 | Perloff et al. | 714/9 |
| 2008/0181196 A1 | 7/2008 | Regan et al. | |
| 2009/0010254 A1 | 1/2009 | Shimada et al. | |
| 2010/0189117 A1 | 7/2010 | Gowda et al. | |

OTHER PUBLICATIONS

PCT International Search Report and Written Opinion mailed Aug. 10, 2012, in related International Application No. PCT/US12/35118, filed Apr. 26, 2012.
PCT International Preliminary Report on Patentability and Written Opinion mailed Nov. 7, 2013, in related International Application No. PCT/US2012/035118.

* cited by examiner

*Primary Examiner* — Kerri Rose
(74) *Attorney, Agent, or Firm* — Haynes and Boone LLP

(57) ABSTRACT

A data communication network includes a client device and multiple aggregation devices coupled to each other and the client via links within a link aggregation group ("LAG") across the aggregation devices. The aggregation devices appear to the client as a single device coupled thereto, and operate in conjunction with each other by assigning at least one different identifier to each of the plurality of separate aggregation devices and storing information including the identifiers to association tables located on each of the aggregation devices. The multiple aggregation devices can be separate switches, and the LAG can include multiple ports across the switches, with a different identifier being assigned to each of the ports in the LAG. A virtual link trunk interface can couple aggregation devices, which can reconfigure communication paths thereacross with respect to the client device using the identifiers in the stored association tables when a LAG link fails.

19 Claims, 5 Drawing Sheets

MULTI-CHASSIS LINK AGGREGATION ON NETWORK DEVICES

CROSS-REFERENCE TO RELATED APPLICATION

This application claims priority to U.S. Provisional Patent Application No. 61/478,967, filed Apr. 26, 2011, entitled "METHOD & APPARATUS FOR OPERATING A MULTI-CHASSIS LINK AGGREGATION," which is incorporated herein by reference in its entirety and for all purposes.

TECHNICAL FIELD

The present invention relates generally to data communication networks and devices, and more particularly to the use of multi-chassis link aggregation groups.

BACKGROUND

As communication networks continue to evolve, there are increasing demands for speed and reliability. Such demands in turn result in the frequent use of multiple paths across network devices in order to increase bandwidth and mitigate the effects of down links and other points of failure. Such mitigated effects often include minimal amounts of unused network capacity, rerouting around failures quickly, and high levels of transparency to affected network devices when rerouting changes are made. Various approaches in this regard involve the use of link aggregation.

Link aggregation refers to a process for operating a group of physical links as if they are a single link. At least one standard for link aggregation has been promulgated by the Institute of Electrical and Electronic Engineers, such as that which is contained in the IEEE 802.1AX-2008 standard, which is incorporated by reference herein.

As noted above, there are various reasons for implementing link aggregation on network switches. One such reason is to increase bandwidth by combining the capacity of multiple physical links together into one logical link. Another reason is to provide link redundancy. In the event that a physical link between two network switches fails, the flow of network traffic assigned to this link can be interrupted with the loss of some or all of the packets in the flow. If an aggregation of links is divided between two switches, then network traffic sent by a failing switch can be rerouted to the other switch for transmission in the event that a particular link of the aggregation of links connected to one switch fails.

As will be readily appreciated, link aggregation can become increasingly complex as more and more links are used across multiple aggregated devices. In particular, the ability for the multiple aggregated devices to work together seamlessly from the perspective of a separate client device can present a number of challenges. Such challenges can include the manner in which aggregated devices on multiple separate devices are able to identify, acknowledge, configure and communicate with each other and with outside clients and other devices effectively.

Although many systems and methods for communicating data across networks have generally worked well in the past, there is always a desire for improvement. In particular, what is desired are improved network systems and methods that allow for readily identifiable and reliable link aggregation across multiple separate devices.

SUMMARY

It can be an advantage of the present invention to provide improved data network systems and methods that allow for readily identifiable and reliable link aggregation on link aggregation groups that span across multiple separate devices. In particular, the various systems and methods provided herein can involve the use of different identifiers for each different device or port in a designated link aggregation group. In such arrangements, the different identifiers can be stored in tables on the various devices included in the link aggregation group.

In various embodiments of the present invention, a data network or system can include a client device adapted to send and receive data over the network, and also a plurality of separate aggregation devices coupled to each other and coupled to the client device via links within a link aggregation group across the plurality of separate aggregation devices. The plurality of separate aggregation devices can be adapted to appear to the client device as a single device coupled thereto, and can be adapted to work in conjunction with each other by assigning at least one different identifier to each of the plurality of separate aggregation devices and storing information including the identifiers to association tables located on each of the plurality of separate aggregation devices.

In various detailed embodiments, the plurality of separate aggregation devices includes a plurality of switches. Further, the link aggregation group can include a plurality of ports across the plurality of separate aggregation devices, and a different identifier can be assigned to each of the plurality of ports in the link aggregation group. In some of these embodiments, at least one of the aggregation devices has a plurality of ports in the link aggregation group. In some embodiments, at least two of the plurality of separate aggregation devices can be coupled to each other via a virtual link trunk interface. In addition, the various aggregation devices can be adapted to reconfigure the communication paths thereacross with respect to the client device using the identifiers in the stored association tables when one of the links in the link aggregation group fails.

In various embodiments, a data network system device can include a plurality of I/O ports, a data packet processing component adapted to process data packets, and to receive data packets from and send data packets to the plurality of I/O ports, and at least one association table adapted to store information with respect to the subject data network device and one or more other separate associated data network devices that form a designated link aggregation group. At least a portion of the I/O ports can be adapted to couple to and facilitate communications with a separate client device, and can be configurable to be part of a designated link aggregation group across the subject data network device and one or more other separate associated data network devices. The stored information can include at least one different identifier for each of the data network device and each of the one or more other separate associated data network devices. Also, the subject data network device can be configured to work in conjunction with the one or more other separate associated data network devices that form the designated link aggregation group to appear to the separate client device as a single device coupled thereto.

In various further detailed embodiments, the data network device can be a switch, and this switch can include a switch control functionality component having a plurality of protocols, a master set of association tables, and/or a link aggregation group sub-layer. One or more of the association tables can include a layer-2 table, and can also include a link aggregation group association table containing identifiers for a local link aggregation group and an associated peer link aggregation group.

In still further embodiments, various methods of providing communications over a data network are disclosed. Such methods can include process steps of designating a link aggregation group on a plurality of ports across a plurality of separate aggregation devices that are all coupled via links to a client device on the data network, assigning at least one identifier to each of the plurality of separate aggregation devices, wherein each identifier is different than every other identifier, and operating the link aggregation group across the plurality of separate aggregation devices using the assigned identifiers such that the link aggregation group appears to the client device as a single device on the network. Additional process steps can include storing the assigned identifiers in association tables on each of the plurality of separate aggregation devices, determining that one of said links has failed, and/or reconfiguring one or more communication paths across the plurality of separate aggregation devices using said identifiers in response to the failure determination. In various embodiments, the assigning step includes assigning an identifier to every port included in the link aggregation group. Further, the plurality of separate aggregation devices can be a plurality of switches.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive devices, systems and methods involving multi-chassis link aggregation. These drawings in no way limit any changes in form and detail that may be made to the invention by one skilled in the art without departing from the spirit and scope of the invention.

DETAILED DESCRIPTION

Figure 1A:
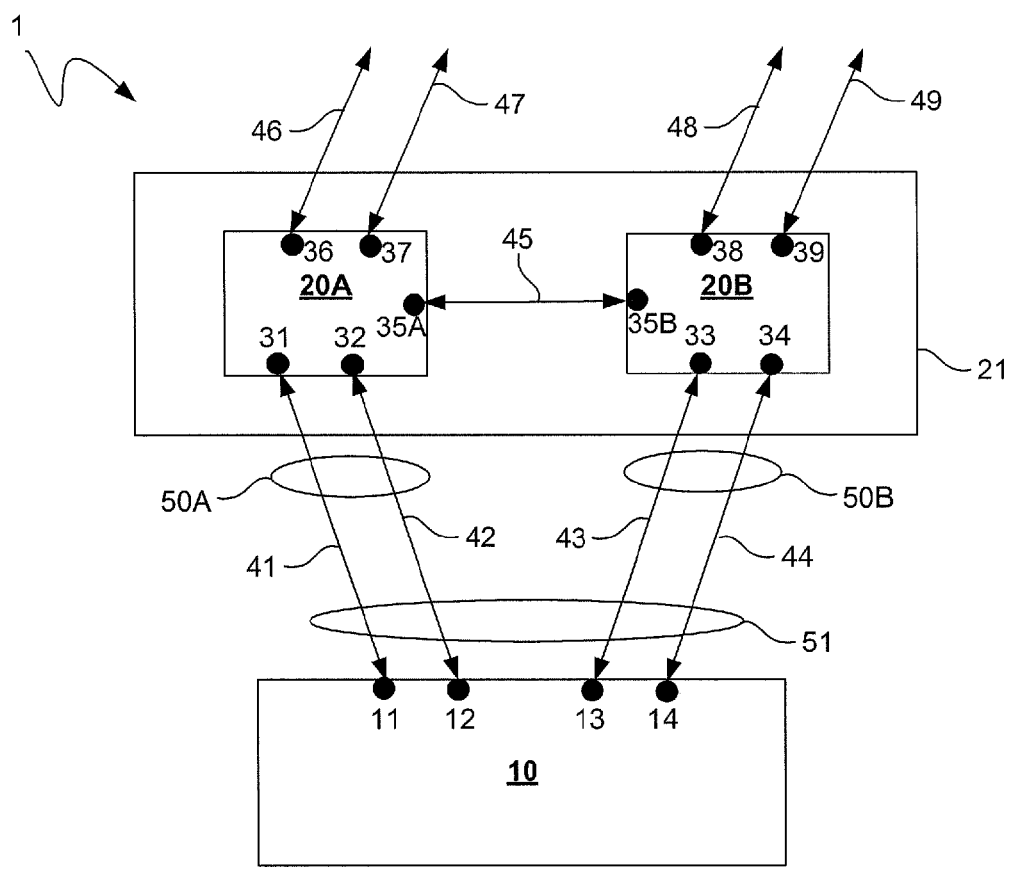
FIG. 1A illustrates in block diagram format a portion of an exemplary data network involving multi-chassis link aggregation according to one embodiment of the present invention.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

The present invention relates in various embodiments to devices, systems and methods involving the communication of data over networks that include multi-chassis link aggregation. Such devices, systems and methods can result in better efficiencies and outcomes with respect to increasing bandwidth and mitigating the effects of down links and other points of failure across data networks, among other possible advantages. In some embodiments, a multi-chassis link aggregation on the network can provide a group of links across multiple devices that is operated as a single link with respect to a given client device. This can be accomplished at least in part through the use of cross-referencing identifiers with respect to various devices, ports and other items associated with a given multi-chassis link aggregation. Such identifiers can be set forth in specific layer-2 tables, for example.

While the various examples disclosed herein focus on particular aspects of multi-chassis link aggregations, it will be understood that the various inventive principles and embodiments disclosed herein can be applied to other data network architectures, arrangements and communications as well.

As a starting point for discussion of the various embodiments disclosed herein, single chassis packet switches can only support a limited number of line cards and ports. A more complex multi-chassis link aggregation refers to an aggregation of links that are divided between two chassis, such as network switches that can be configured in a stacked switch arrangement with respect to each other. Some multi-chassis link aggregation vendors provide special links or a Virtual Link Trunk Interface ("VLTI") that can be used to connect two separate switches together to form an aggregation switch that in at least some ways acts with peer devices like a single larger chassis. With two chassis aggregated in this manner, when a packet arrives at one of the switches that must egress on the other switch, the first switch forwards the packet to a port associated with the VLTI where it is transmitted to the other device for transmission over the network.

Beginning with FIG. 1A, a portion of an exemplary data network involving multi-chassis link aggregation is illustrated in block diagram format. Network 1 can include a wide variety of components, such as, for example, a client 10 and two switches 20A, 20B ("switch A and switch B") that are configured as an aggregation switch 21 with respect to each other. Client 10 can include a number of ports 11-14, while switches 20A and 20B also include a separate number of ports 31-39. Each of the switches A and B contained within the aggregation switch 21 can be connected to a separate switch or other client device 10 over different sets of physical links 41-44, each of which can be configured on either or both switches as a link aggregation group ("LAG").

While a relatively small number of switches, ports and links are shown in FIG. 1A for purposes of simplicity in illustration, it will be readily appreciated that many more of each of these items can be included. Other links can include a VLTI 45 between ports 35A and 35B on switches A and B, as well as various links 46-49 that connect to further network devices that are not shown here for purposes of illustration. In order to provide for link redundancy between each of the network switches 20A, 20B and the client device 10, a first local LAG 50A ("LAG.A") can be configured on switch 20A, while a second local LAG 50B ("LAG.B") can be configured on switch 20B. A separate host LAG 51 can be local to the client 10.

Multi-chassis link aggregation ("MLAG") is a LAG implementation where the LAG terminates on two separate chassis or devices. A MLAG can be configured so that one or more links comprising one LAG terminate at ports on a first device and one or more links comprising the same LAG terminate on a second device. The first and second devices are often aggregated so that they appear to the surrounding network to be one logical device. A helpful functionality for configuring a MLAG, for example, is described in the IEEE standards publication 802.3ad. A MLAG is often used to provide link redundancy between two devices in a network, such as between a client device and other network devices. Both or all sets of links associated with a MLAG are typically active. In the event that one set fails, however, then only one set or a subset remains active, in which case all network traffic is directed to the remaining active set(s) of links associated with the MLAG. FIG. 1 is just one illustrative example of two switches 20A, 20B connected to a client device 10, wherein the two switches are manually configured with a MLAG.

That is, FIG. 1 shows an aggregation switch 21 comprising switch 20A and switch 20B, and a client switch connected to switch 20A over a first set of two physical links 41, 42 and connected to switch 20B over a second set of two physical links 43, 44. Two switch A ports 31, 32 are configured to be members of a local LAG.A (50A) that is local to switch 20A, while two switch B ports 33, 34 are configured to be members of a local LAG.B (SOB) that is local to switch 20B. In this arrangement, "local" refers to the LAG that is configured and controlled locally on each switch, 20A or 20B, which together combine to form the aggregation switch 21. Again, switch A and switch B can be connected to each other over a VLTI 45 that can include one or more physical links. Among other things, the VLTI 45 can serve to pass network traffic from one switch to the other switch depending upon a number of considerations, which can include, for example, the state of the local LAGs in each of the switches 20A, 20B, as well as load balancing therebetween.

One or more ports, such as 35A on switch 20A, can be connected to one end of the VLTI 45, while one or more corresponding ports, such as 35B on switch 20B, can be connected to the other end of the VLTI. The client 10 can be configured with four ports 11-14 that are members of a host or client LAG 51. Two switch A ports 31, 32 terminate the two physical links 41, 42 connecting the client 10 to switch A, and two switch B ports 33, 34 terminate the two physical links 43, 44 connecting the client to switch B. The client 10 connected to both switches 20A and 20B can have a media access control ("MAC") address of "10," for example. Although both LAG.A and LAG.B are typically active, only one of these local LAGs is active and capable of receiving or transmitting traffic to network devices connected to the LAG when the other one fails for any reason. Also, in an aggregation switch topology, one of the two switches is often designated at any point in time to be a primary switch, while the other one is then designated as a secondary switch.

Again, although the aggregation switch 21 in FIG. 1 is shown to be configured with two local LAGs 50A, 50B, with two ports on each of switches 20A and 20B assigned to be members of each LAG, one or both of these LAGs can include one or more member ports and these ports may or may not be identified as members of a LAG.

Figure 1B:
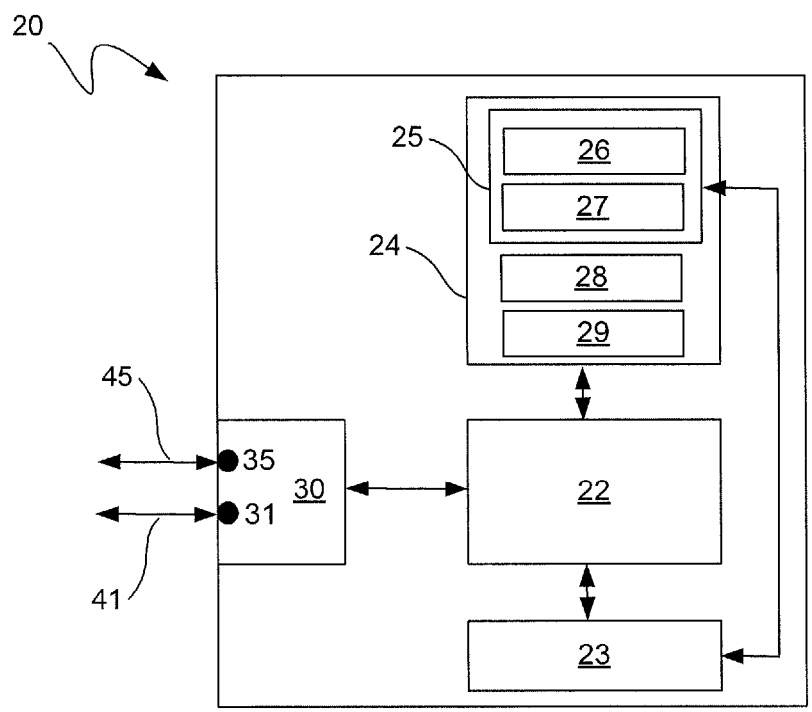
FIG. 1B illustrates in block diagram format an exemplary internal topology of a switch as shown in FIG. 1A according to one embodiment of the present invention.

Moving next to FIG. 1B, an exemplary internal topology of a switch as shown in FIG. 1A is similarly shown in block diagram format. It will be understood that the topology and functionalities shown for switch 20 of FIG. 1B can be the same or similar for either of switches 20A or 20B in FIG. 1A above, and that such items can operate to support various embodiments of a multi-chassis link aggregation. The switch 20 can include a plurality of I/O ports 30, a packet processing and switch fabric component 22, layer-2 tables 23 and a switch control functionality portion 24. The I/O ports 30 can be connected to one or more outside switches or other client devices, such as by port 31 along link 41. In addition, one or more ports can be connected to the VLTI that connects switch A to switch B, such as by port 35 along link 45. Of course, I/O ports 30 can also include a number of other ports and can also be connected to other network devices. The packet processing functionality 22 can use information included in the network data received at the switch 20, as well as information stored in the layer-2 tables 23 to identify a next hop for the network data, among other possible activities. The switching fabric then schedules the network data for propagation through the switch to an egress port for transmission to the next hop.

The switch control functionality component 24 can include various layer-2 protocols 25, which can involve a link aggregation control protocol ("LACP") 26, as well as other layer-2 protocols 27. The control function component 24 can also include a LAG sub-layer 28, and also a master set of layer-2 tables 29. The LACP 26 can be used by the LAG sub-layer 28 to configure, maintain and terminate link aggregation groups on each of the switches. The LAG sub-layer 28 can also use information returned by the LACP 26 to set up different LAGs, forward network traffic through the switch over one or more LAGs, and to activate and deactivate LAGs depending upon the state of the member ports of the LAG or other network state. The switch control functionality 24 also can include master layer-2 tables 29 that store network information associated with neighboring devices that is used to build and maintain the layer-2 tables used by the packet processing functionality 22.

At any point in time, only one switch within a given aggregation switch typically operates in a primary switch role, while the remaining switch or switches operate in a secondary role. In the primary role, the primary switch assumes control over at least some of the aggregation switch functionality. Among other things, this can involve the primary switch being responsible for running some layer-2 network protocols (such as LACP) that assist in the operation of the switch in the network environment. The network information learned by the primary switch can be distributed as needed to the secondary switches in order to synchronize at least some of the states between the primary and secondary switches.

Figure 2:
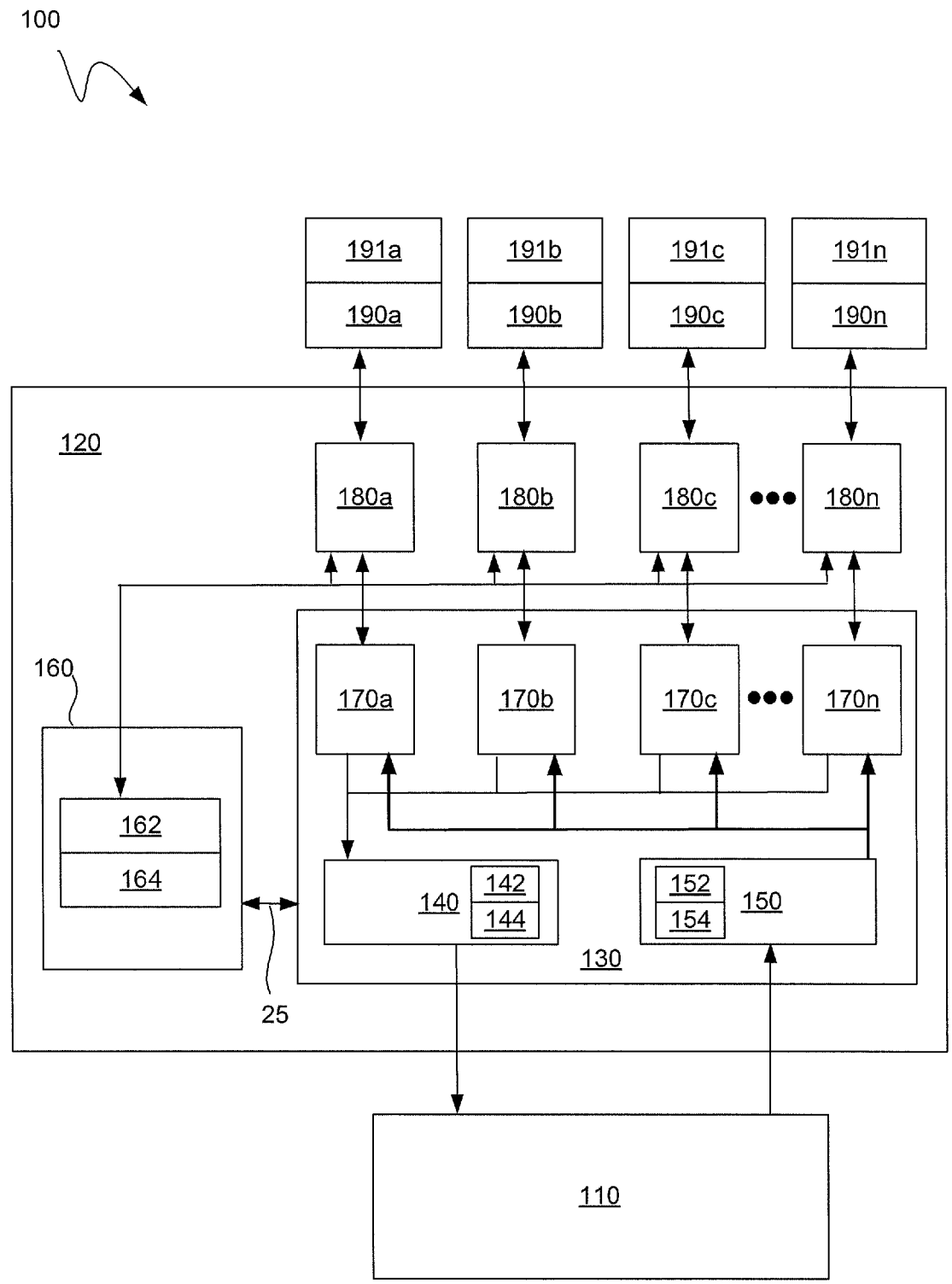
FIG. 2 illustrates in block diagram format an extended layout for a portion of a switch included in an exemplary data network involving multi-chassis link aggregation according to one embodiment of the present invention.

Turning next to FIG. 2, an extended layout for a portion of a switch included in an exemplary data network involving multi-chassis link aggregation is shown in block diagram format. Data network 100 can include a MAC client 110, a link aggregation sub-layer 120, a plurality of individual MACs 190a-190n, and a corresponding plurality of individual physical layer transponders 191a-191n. The link aggregation sub-layer 120 can serve to combine a number of physical ports 190/191 logically for presentation to MAC client 110 as a single logical MAC. Although four physical ports are shown, it will be understood that more or less than four physical ports are supportable by the framework, with up to the same number of MAC clients as physical ports supportable as well.

Link aggregation sub-layer 120 is further subdivided into several logical components, including control parser/multiplexers ("muxes") 180a-180n, an aggregator 130, and aggregation control unit 160. Each control parser/mux 180x can be coupled to a corresponding MAC 190x, such as across an IEEE 802.3 MAC service interface. For egress frames, such as those transmitted by a physical layer transponder 191x, a respective control parser/mux 180x passes frame transmission requests from aggregator 130 and aggregation control unit 160 to the appropriate port. For ingress frames, such as those received by a physical layer transponder 191x, a respective control parser/mux 180x can distinguish link aggregation control ("LAC") protocol data units ("PDUs") from other frames and pass the LACPDUs to aggregation control unit 160, with all other frames passing to aggregator 130. As such, aggregation control unit 160 can include LACP values 162, as well as a LAC unit or controller 164.

It will be readily appreciated that although only one aggregator 130 is shown in FIG. 2, there could be additional aggregators as may be desired. Each control parser/mux 180x passes its non-LACPDU ingress traffic to a particular aggregator 130 bound to a respective MAC 190x, or alternatively discards the non-LACPDU traffic when the respective MAC is not bound to an aggregator. As shown, aggregator 130 can include a frame collection block 140, a frame distribution block 150, and a plurality of aggregator parser/muxes 170a-170n. Aggregator 130 can communicate with MAC client 110 across an IEEE 802.3 MAC service interface, for example. Aggregator 130 can also communicate with each control parser/mux 180x that corresponds to a given MAC 190x that is bound to the aggregator.

Frame distribution block 150 can include a frame distributor 152 and an optional marker generator/receiver 154. The frame distributor 152 can receive ordinary traffic frames from MAC client 110 and employ a frame distribution algorithm to distribute the frames among the ports bound to the aggregator 130. Frame distributor 152 is preferably not constrained as to how it distributes frames to its bound ports, other than that it is expected to supply frames from the same flow to the same egress port. Frame distribution 150 holds or discards any incoming frames for the conversation while marker generator/receiver 154 generates a marker frame on the port handling the conversation. When a return marker frame is received, all in-transit frames for the conversation have been received at the far end of the aggregated link, and frame distribution may switch the conversation to a new egress port.

When bound to one of the physical ports 191x, aggregator parser/muxes 170x transfer frames with their corresponding control parser/mux 180x. On transmit, aggregator parser/muxes 170x take egress frames (i.e., ordinary traffic and marker frames) from frame distribution block 150 and supply them to their respective bound ports. For ingress frames received from their bound port, each aggregator parser/mux 180x can distinguish ordinary MAC traffic, marker request frames, and marker response frames, and pass each to frame collector 142, marker responder 144, and marker generator/receiver 154 respectively.

Aggregation control unit 160 can be responsible for configuration and control of link aggregation of ports that are assigned to be members of a LAG. In various embodiments, however, much of the configuration and control functionality of the aggregation control unit 160 can be deactivated. In such arrangements, LACPDUs are not generated by the aggregation control unit 160 and sent to a peer switch, but rather each switch on which a LAG is configured can be manually configured by a systems administrator. For example, the local LAG.A on switch 20A of FIG. 1 can be manually configured, and this LAG can be manually configured to include one or more ports on the switch to be members of the LAG A. In this case, ports 31 and 32 are assigned to be members of LAG.A, but only one or more than one port on switch 20A can be assigned.

The aggregation control unit 160 generally operates to maintain per link information in forwarding tables on each of the line cards comprising a switch. This information can include such things as the identity of a LAG to which the link belongs, the identity of the aggregator to which the LAG belongs, and the status of interaction between the frame collection function or the frame distribution function of the aggregator and the link. More specifically, the aggregation control unit 160 can communicate state information to an aggregator on a line card, and the aggregator on the line card can then this information to maintain data in the forwarding tables as necessary to forward network information over a LAG. The aggregation control unit 160 unit can also receive information from a layer-2 protocol running in the control module relating to the state of each link assigned to the LAG. In the event that one link assigned to the LAG fails then, the aggregation control unit 160 becomes aware of this failure and communicates this to the aggregator 130, which then reprograms the forwarding tables accordingly. Various other link aggregation terminologies and concepts that may be useful to understanding the embodiments disclosed herein can be found at, for example, the IEEE 802.1-2008 standard, which is incorporated by reference herein for such purposes.

As will be readily appreciated, it is important for the various switches and other components in a LAG to be able to identify each other and accordingly route data packets through the various LAG components properly and quickly. Such identifications can be readily had by assigning labels or identifiers to the various aggregation devices and/or ports thereon within a LAG, and there are a number of different ways to accomplish such label or identifier assignments. One approach can involve assigning a common identifier to each of the aggregation devices and ports within a designated LAG, such that all such devices and ports contain the same common identifier. For example, the identifier "MLAG 5" can be assigned to all devices and ports in a given MLAG.

Other identification approaches can involve assigning different identifiers to each of the aggregation devices and/or ports within a designated LAG. Such different identifiers for each of the different devices and/or ports can then be stored in association tables located on one or more of the aggregation devices. In some embodiments, each separate aggregation device in a given MLAG can include one or more association tables having identifiers for the various items in the MLAG. Such association tables can be, for example, layer-2 tables, although other types of tables can be used depending upon the nature of the overall data network and system components. Although the nature and format of such association tables can vary, a few simplified examples will now be provided for purposes of illustration.

Figure 3A:
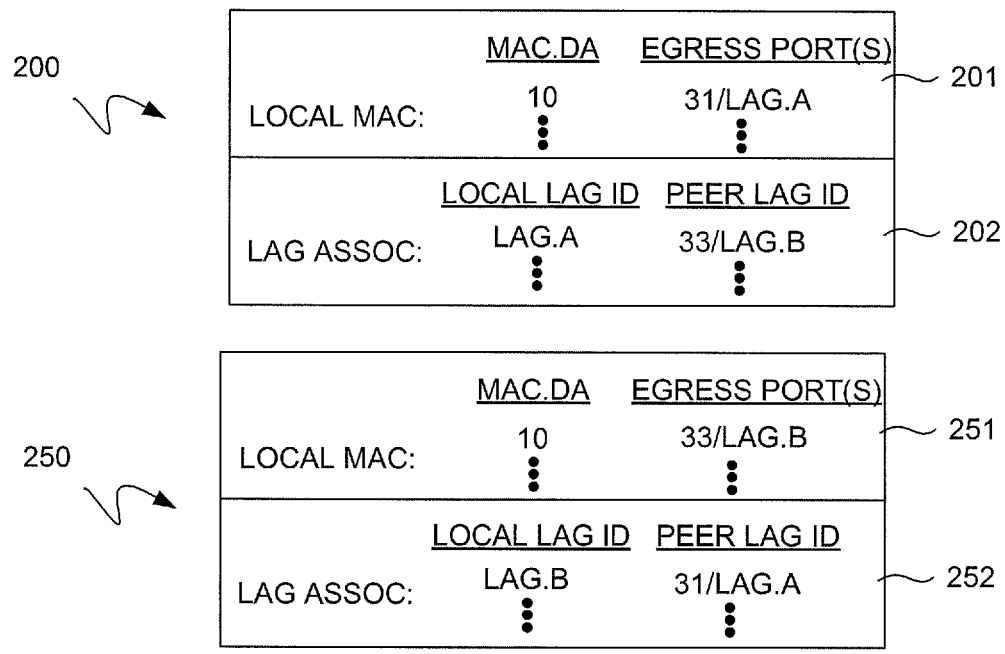
FIG. 3A illustrates in layer-2 table format exemplary lookup values for switches in a normally operating configuration within a network involving multi-chassis link aggregation according to one embodiment of the present invention.
Figure 3B:
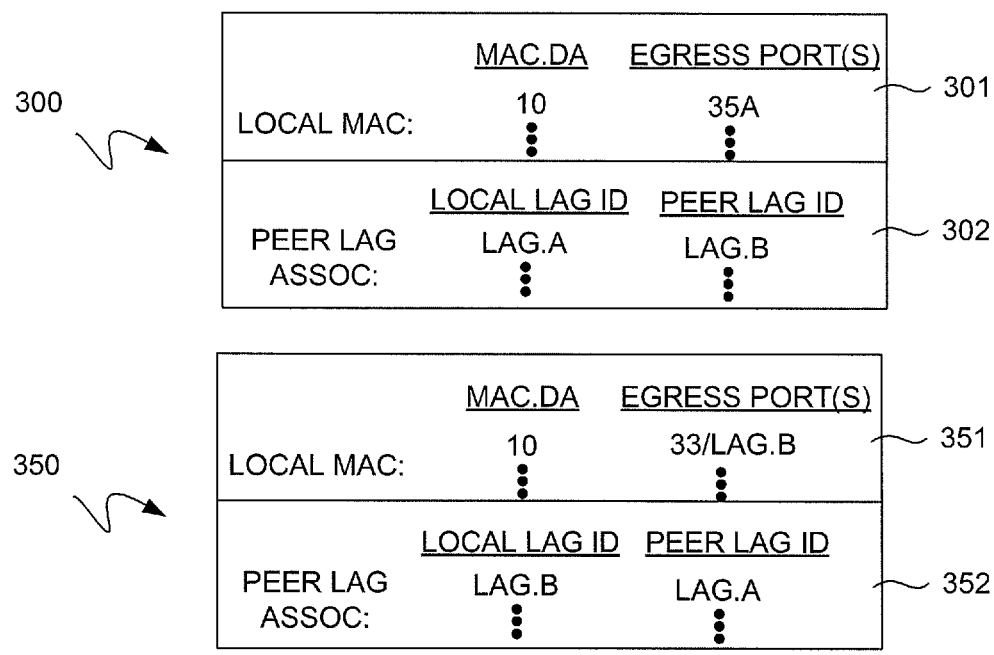
FIG. 3B illustrates in layer-2 table format exemplary lookup values for switches in a failover reconfiguration within a network involving multi-chassis link aggregation according to one embodiment of the present invention.

Continuing with FIGS. 3A and 3B, several examples of association tables for use in aggregation devices within a network involving multi-chassis link aggregation are provided. FIG. 3A illustrates in layer-2 table format exemplary lookup values for switches in a normally operating configuration, while FIG. 3B illustrates in layer-2 table format exemplary lookup values for switches in a failover reconfiguration where one LAG within an overall MLAG has failed. It will be understood that the association tables of FIGS. 3A and 3B can be used with switches in either of network 1 of FIG. 1A or network 400 of FIG. 4, as set forth below.

Prior to activating or during operation of an overall aggregation switch, such as switch 21 of FIG. 1A (or switch 421 of FIG. 4), various layer-2 tables can be manually configured as shown in the tables 200, 250 of FIG. 3A. In the event that the local LAG.A is terminated, information included in one or more of the entries in the layer-2 tables can be automatically reconfigured as shown in the tables 300, 350 of FIG. 3B. Starting with FIG. 3A, exemplary formats for layer-2 table 200 local to switch A and layer-2 table 250 local to switch B are shown. As shown, an upper portion 201, 251 of each table is a local MAC table, while a lower portion 202, 252 of each table is a LAG association table. The local MAC tables includes two entries, with one entry including the MAC address of the client device (i.e., 10) and the identities of the egress ports that are members of the local LAG, LAG.A or LAG.B, configured on the switch (which are the identities of the local ports 31 and 33 in this example). The LAG association tables include two entries, with one entry including the identity of the local LAG (e.g., LAG.A or LAG.B) and the other entry including the identity of the peer LAG (e.g., LAG.B or LAG.A). As shown in FIG. 3A, the peer LAG ID entry in the LAG association table can be the identity of a port if the egress port entry in the associated peer MAC table includes the identity of that port.

Although only one entry is provided in each category in the tables of FIGS. 3A and 3B, it will be readily that many more entries can be included in each category of each table, as appropriate for a given network or device having greater complexity. For example, there can be and typically are more than one LAG configured locally on each of the switches comprising the stacked switch, and the master switch can discover more than one MAC address associated with network devices other than the lone client 10 shown in FIG. 1. Depending upon the switch configuration, which can involve the number of ports, the number of configured LAGs and so forth, and depending upon the topology of the network to which the switch is attached, both the local MAC and peer MAC tables on each of the switches (i.e., A and B) typically include many more entries than shown and described. Such expanded entries are reflected by the added amount of space and vertical ellipses after the first entry in each category, but are not detailed further for purposes of simplicity in illustration and discussion here.

FIG. 3B shows how local MAC and LAG association tables that are maintained on switch B are reconfigured in the event that LAG.A is terminated. Tables 300, 350 are in the same format and have many of the same entries as the layer-2 tables described with reference to FIG. 3A. Similar to the tables of FIG. 3A, each of tables 300, 350 includes an upper portion 301, 351 that is a local MAC table, and a lower portion 302, 352 that is a LAG association table. In some embodiments, tables 300, 350 can be the exact same tables as tables 200, 250, only with one or more changed entries contained therein. For example, the switch A egress port entry of table 300 is changed to point to the port 35A that is local to switch A that is connected to the VLTI. This reflects the reconfiguration that takes place when LAG.A fails.

In operation, when the two switches 20A and 20B and the client device 10 go active, switch 20A can be designated as the primary switch, whereby it employs standard layer-2 MAC learning techniques to discover the MAC addresses of network devices connected to it, such as the MAC address for client device 10. The MAC addresses learned are then passed to the secondary device(s) (e.g., switch 20B in this example) over the VLTI in a configuration message. In addition to the MAC address of the client, this configuration message can also include the identity of the port on switch 20A where the MAC was learned, as well as the unit number or identifier of switch 20A. Alternatively, the configuration message send to switch 20B can include the MAC address of the client 10, the local LAG ID (LAG.A in this example) over which the MAC was learned, and the unit number or identifier of switch 20A. Information included in the configuration message and information manually configured on each switch can be used to build the layer-2 tables local to each of the switches 20A and 20B, as shown in FIGS. 3A and 3B. When the master switch in the aggregation switch 21 receives a packet with a MAC destination address ("MAC.DA") of 10, for example, the packet processing function in switch 20A examines its local layer-2 table and hits the MAC.DA=10, which points to the local egress ports 31 or 32. The LAG sub-layer includes functionality that operates to distribute the packet to one or the other of the identified egress ports 31 or 32.

In the event that the primary LAG (e.g., LAG.A) goes down for some reason, then the LAG sub-layer functionality on switch 20A detects this event and reacts by deactivating LAG.A and activating LAG.B. Detection can be accomplished by way of the LAG sub-layer tracking the state of LAG.A and notifying the packet processor when failure occurs. Deactivation and activation can be accomplished by way of the LAG sub-layer running on the primary switch. Terminating LAG.A on switch 20A can then trigger an update to the layer-2 MAC table local to switch 20A such that the information included in the egress port entry is modified to point to the one or more ports 35A on the local switch that are associated with the VLTI between switch 20A and switch 20B. A packet ingressing to switch 20A that is to be forwarded over LAG.A is then forwarded to egress port 35A on the local switch for transmission over the VLTI to switch 20B. Switch 20B examines the packet and identifies the MAC.DA, which in this example is 10, and switches the packet to either port 33 or 34 for transmission over LAG.B to the client device 10.

Typically, the number of egress ports assigned to a local LAG are the same for the peer switches A and B. However, this need not be the case as one switch can be configured such that one port is a member of the local LAG and the other switch can be configured such that two ports are members of the local LAG. For example, if port 31 on switch 20A is assigned to the local LAG and if ports 33 and 34 on switch 20B are assigned to the local LAG, then the layer-2 MAC table egress port entry for switch 20A is programmed with the identity of 31 and the layer-2 MAC table egress port entry for switch 20B is programmed with the identity of the local LAG, which is LAG.B. Any combination of ports and LAG IDs can be used in the egress port entries, depending upon the number of egress ports on each switch that are assigned to be members of the local LAG.

Figure 4:
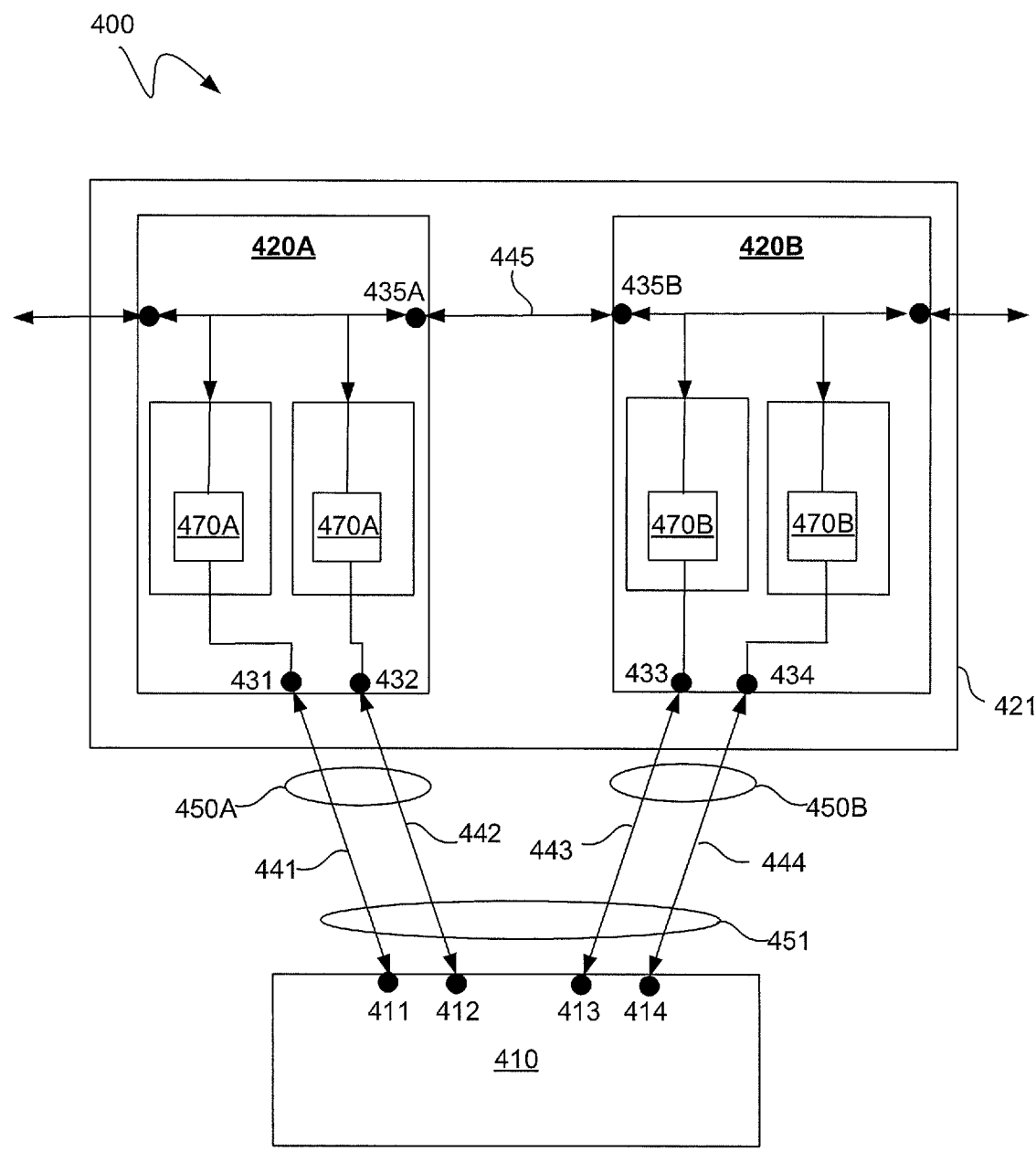
FIG. 4 illustrates in block diagram format an exemplary alternative data network involving multi-chassis link aggregation according to one embodiment of the present invention.

Turning next to FIG. 4, an exemplary alternative data network involving multi-chassis link aggregation according to one embodiment of the present invention is also shown in block diagram format. Network 400 can be similar to network 1 above, with several additional features or functions added. Similar to the foregoing examples, network 400 can include a client 410 having ports 411-414 and two switches 420A, 420B having ports 431-435 that are configured as an aggregation switch 421 with respect to each other. Data communications can take place over different sets of physical links 441-444, as well as a VLTI 445 between ports 435A and 435B on switches 420A and 420B. A first local LAG 450A, second local LAG 450B and separate host LAG 451 can also be provided.

One of switches 420A or 420B can sometimes receive a packet on a port for which a MAC.DA does not exist in either of the switch 420A or 420B layer-2 tables. This can happen, for example, when a neighboring device is first initialized and MAC discovery has not yet taken place. In such cases, the packet can be flooded to all ports that are members of the same VLAN as the one on which the packet ingressed. For example, if a given packet is ingressed to a given port on switch 420A and the switch 420A layer-2 tables do not include the MAC.DA included in that packet, then switch 420A could flood the packet out to ports 431, 432 and 435A. Given the aggregation switch configuration, duplicate packets can be sent from switch 420A and switch 420B to the client device 410. In order to prevent the transmission of duplicate packets to the client device, a filter can be implemented on both switch 420A and switch 420B. This filter can be implemented as an access control list ("ACL") that is associated with the egress ports on switches 420A and 420B that are members of LAG.A and LAG.B respectively. ACL 470A can be programmed such that if a packet ingresses to switch 420B and there is a MAC.DA miss, then the packet that is transmitted over the VLTI 445 in the resultant flooding operation is dropped at ports 431 and 432 on switch 420A. ACL 470B can be programmed in a similar manner as ACL 470A to drop packets arriving at switch 420B over the VLTI 445. More specifically, the ACL 470A can be programmed not to accept packets ingressing to switch 420A on a port that is assigned a particular port ID, which in this case could be port 435A.

Figure 5:
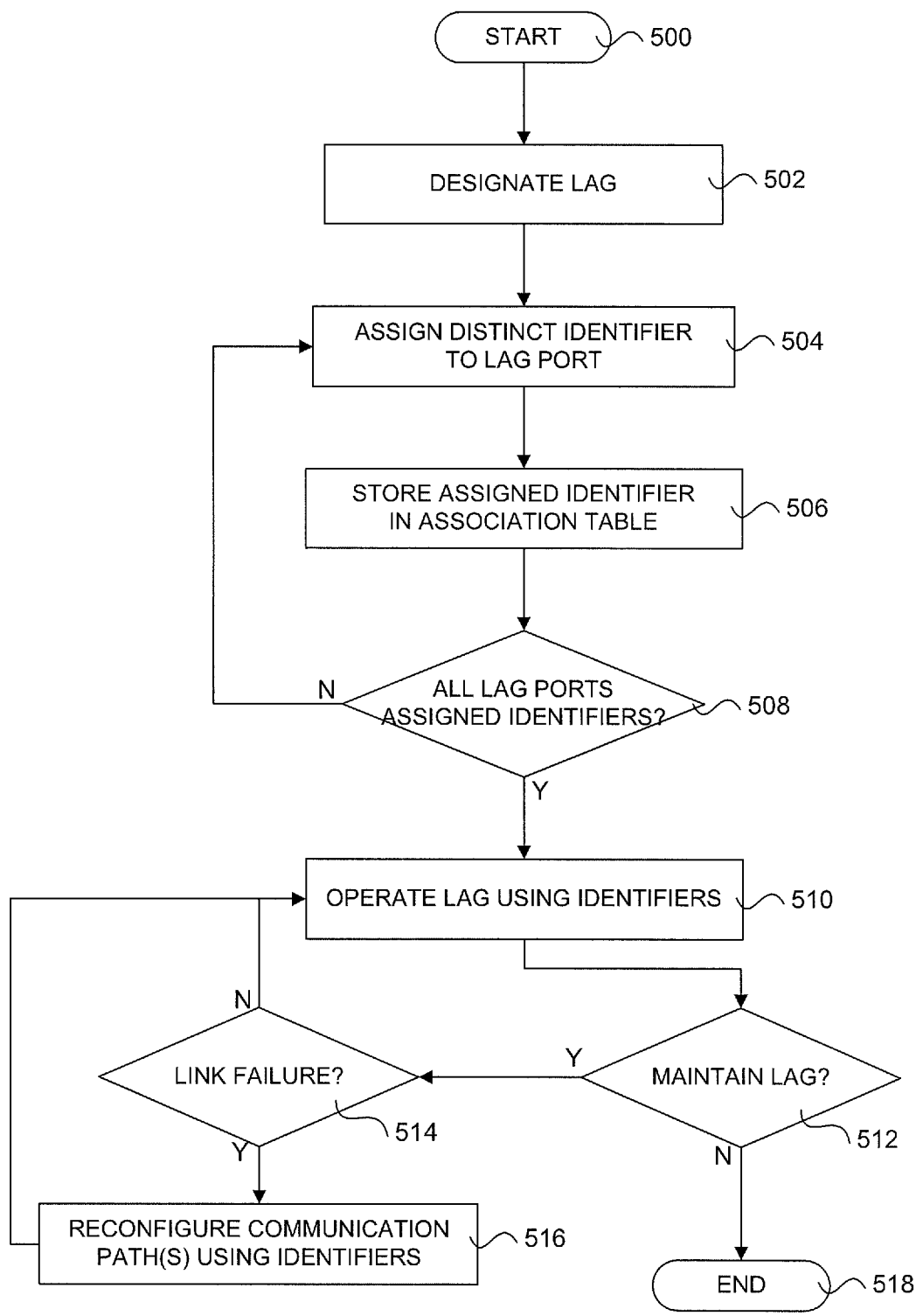
FIG. 5 provides a flowchart of an exemplary method of providing communications over a data network involving multi-chassis link aggregation according to one embodiment of the present invention.

Although a wide variety of applications and processes involving multi-chassis link aggregation on network devices can be envisioned, one basic method is provided here as an example. Turning lastly to FIG. 5, a flowchart of an exemplary method of providing communications over a data network is illustrated. In particular, such a method can involve the use of a multi-chassis link aggregation group that utilizes different identifiers for each device or port in the MLAG. Any of the various networks, systems, switches, devices and various features thereof can be used in association with the provided method. Further, it will be readily appreciated that not every method step set forth in this flowchart is always necessary, and that further steps not set forth herein may also be included. Furthermore, the order of steps can be rearranged in some embodiments where suitable. For example, step 506 might be located after step 508 in some cases.

Beginning with a start step 500, a LAG is designated at process step 502. Such a LAG can in fact be a MLAG where it extends across multiple separate devices. At subsequent process step 504, a distinct identifier can be assigned to a given device or port of the LAG. Such an identifier can be different than every other identifier used in the LAG. The assigned identifier can then be stored in one or more association tables at process step 506. At a following decision step 508, an inquiry is made as to whether all of the appropriate devices and/or ports on the LAG have been assigned an identifier. If not, then the method reverts to step 504, and steps 504 through 508 are repeated.

Once all identifiers are suitably assigned, then the method continues to process step 510, where the LAG is operated using the assigned identifiers. As noted above, the LAG can include a plurality of separate aggregation devices that appear to a separate client device as a single device coupled thereto. At a following decision step 512 an inquiry is made as to whether the LAG is to be maintained. If so, then another inquiry can be made at decision step 514 as to whether there is any link failure on the LAG. If not, then the method reverts to process step 510, whereby steps 510 and 512 are repeated. In the event that a link failure is detected at step 514, however, then one or more communication paths within the LAG can be reconfigured using the identifiers at process step 516. After such reconfiguration, the method then reverts to process step 510. Steps 510-516 are repeated until the inquiry at step 512 results in a no with respect to maintaining the LAG, at which point the method proceeds to finish at and end step 518.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A data network, comprising:
a client device adapted to send and receive data over the network; and
a plurality of separate aggregation devices coupled to each other and coupled to the client device via links within a first link aggregation group (LAG) across the plurality of separate aggregation devices, wherein the plurality of separate aggregation devices are adapted to appear to the client device as a single device coupled thereto and are adapted to work in conjunction with each other by assigning at least one different identifier to each of the plurality of separate aggregation devices and storing information including the identifiers to association tables located on each of the plurality of separate aggregation devices;
wherein the links comprise:
one or more first links coupling a first aggregation device of the separate aggregation devices to the client device and forming a second LAG; and
one or more second links coupling a second aggregation device of the separate aggregation devices to the client device and forming a third LAG;
wherein a first association table of the association tables in the first aggregation device includes an entry associating the second LAG with the third LAG, the third LAG acting as a backup LAG when the second LAG goes down.

2. The data network of claim 1, wherein said plurality of separate aggregation devices includes a plurality of switches.

3. The data network of claim 1, wherein the first link aggregation group includes a plurality of ports across the plurality of separate aggregation devices.

4. The data network of claim 3, wherein a different identifier is assigned to each of the plurality of ports in the first link aggregation group.

5. The data network of claim 3, wherein at least one of the aggregation devices has a plurality of ports in the first link aggregation group.

6. The data network of claim 1, wherein at least two of the plurality of separate aggregation devices are coupled to each other via a virtual link trunk interface.

7. The data network of claim 1, wherein said plurality of separate aggregation devices are adapted to reconfigure the communication paths thereacross with respect to the client device using the identifiers in the stored association tables when one of the links in the first link aggregation group fails.

8. A data network device, comprising:
a plurality of I/O ports, at least a portion of which are adapted to couple to and facilitate communications with a separate client device and are configurable to be part of a designated link aggregation group (LAG) across said data network device and one or more other separate associated data network devices;
a data packet processing component adapted to process data packets, and to receive data packets from and send data packets to the plurality of I/O ports; and
at least one association table adapted to store information with respect to said data network device and the one or more other separate associated data network devices that form the designated link aggregation group, wherein the stored information includes at least one different identifier for each of the data network device and each of the one or more other separate associated data network devices,
wherein said data network device is configured to work in conjunction with the one or more other separate associated data network devices that form the designated link aggregation group to appear to the separate client device as a single device coupled thereto;
wherein said at least one association table includes an entry associating a first LAG coupling the data network device to the client device with a second LAG coupling one of the other separate associated data network devices to the client device.

9. The data network device of claim 8, wherein said data network device comprises a switch.

10. The data network device of claim 9, wherein said switch further comprises:
a switch control functionality component including a plurality of protocols and a master set of association tables.

11. The data network device of claim 10, wherein said switch control functionality component further includes a link aggregation group sub-layer.

12. The data network device of claim 8, wherein said at least one association table includes a layer-2 table.

13. The data network device of claim 8, wherein the designated link aggregation group includes a plurality of ports across said data network device and the one or more other separate associated data network devices.

14. The data network device of claim 13, wherein a different identifier is assigned to each of the plurality of ports in the designated link aggregation group.

15. A method of providing communications over a data network, the method comprising:
designating a first link aggregation group (LAG) on a plurality of ports across a plurality of separate aggregation devices that are all coupled via links to a client device on the data network;
assigning at least one identifier to each of the plurality of separate aggregation devices, wherein each identifier is different than every other identifier;
operating the first link aggregation group across the plurality of separate aggregation devices using the assigned identifiers such that the link aggregation group appears to the client device as a single device on the network; and
maintaining an association table, the association table associating a second LAG between a first aggregation device of the separate aggregation devices and the client device with a third LAG between a second aggregation device of the separate aggregation devices and the client device.

16. The method of claim 15, further comprising the step of:
storing the assigned identifiers in association tables on each of the plurality of separate aggregation devices.

17. The method of claim 15, wherein said assigning step includes assigning an identifier to every port included in the first link aggregation group.

18. The method of claim 15, wherein said plurality of separate aggregation devices comprises a plurality of switches.

19. The method of claim 15, further comprising the steps of:
determining that one of said links has failed; and
reconfiguring one or more communication paths across the plurality of separate aggregation devices using said identifiers in response to said determining.

* * * * *